UNITED STATES PATENT OFFICE.

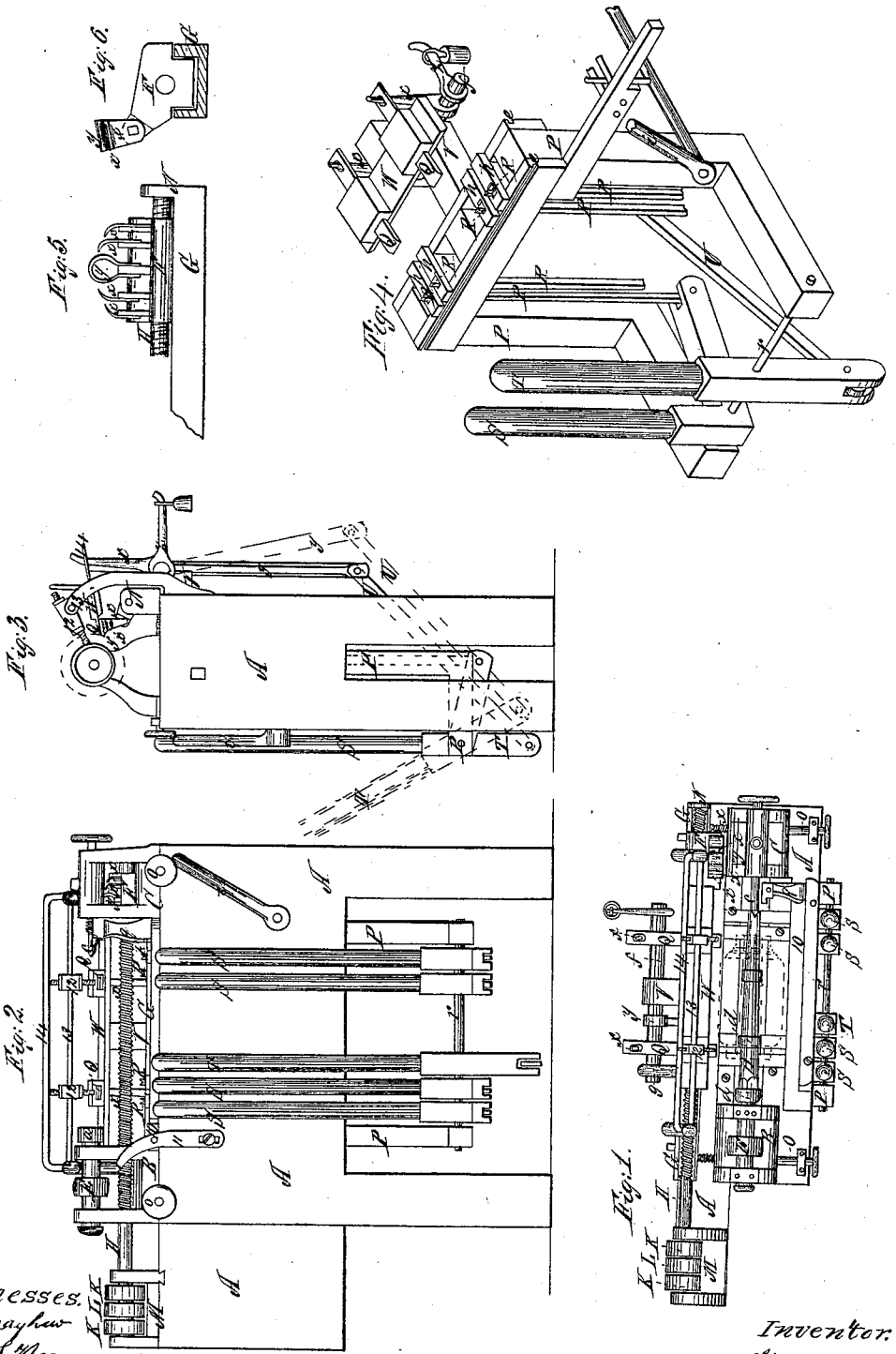

HENRY C. SISCO, OF INDIANAPOLIS, INDIANA, ASSIGNOR TO HIMSELF AND OSGOOD & SMITH, OF SAME PLACE.

IMPROVEMENT IN LATHES FOR TURNING WAGON-HUBS.

Specification forming part of Letters Patent No. 53,382, dated March 20, 1866.

*To all whom it may concern:*

Be it known that I, HENRY C. SISCO, of Indianapolis, county of Marion and State of Indiana, have invented a new and useful Machine for Turning Wagon-Hubs; and I do hereby declare that the following is a full and exact description thereof, reference being had to the accompanying drawings, making part of this specification, in which—

Figure 1 is a plan or top view of the machine. Fig. 2 is a front elevation of the machine. Fig. 3 is an end elevation of the machine. Fig. 4 is an isometric perspective view of the chisel-frame and levers. Figs. 5 and 6 are details of the roughing-off chisels and screw for operating the same. (Only part of the screw shown.)

Similar letters of reference indicate corresponding parts in the several figures.

To enable others skilled in the art to make and use my invention, I will proceed to describe its construction and operation.

A is a substantial frame of wood, to which all the other parts are attached. B is the head-block, and C the tail-block or back-center, arranged and operated as in ordinary turning-lathes. D is an iron mandrel, tapering, with the large end squared to fit into the chuck $a$ in the head-block, and the small end centered to receive the pivot $c$ of the back-center, as shown in Fig. 1.

The block of wood from which the hub is to be turned is bored longitudinally in the usual manner and driven on the mandrel sufficiently tight to prevent slipping while being turned. There are two collars or enlarged places, $d\ d$, on the mandrel, which serve to hold the hub-block more securely than if the mandrel had an even surface. The position of the hub-block is shown in red lines in Fig. 1 as already turned and finished. The hub-block is rotated by means of a belt around pulley E in the usual manner. The hub-block is first roughed off by means of what I shall call the "roughing-off chisels" $x\ x\ x\ x\ y$, which are attached to the block or chisel-head F, as shown. The chisel-head F moves back and forth on a guide, G, attached to the upper rear edge of the frame A, and is operated by the long screw H, which works in a thread in the chisel-head F. The screw H is driven by two belts around pulleys K K L, K K being loose pulleys. One of the belts is crossed, the other straight, the object of which is to rotate the screw H in either direction, which will cause the chisel-head F to travel in one direction while roughing off one hub-block, and then by shifting the belts to travel in the other direction while roughing off the next hub-block, and so on alternately, and thus losing neither time nor power. The screw H has one of its bearings in the pulley-block M and the other at N, which is attached to the guide G. The pulley-block M and guide G are attached to the frame A by dovetailed slides, so that they may be moved together to and from the hub-block, which is done by means of the set-screws O O, the object of which is to adjust the roughing-off chisels to hub-blocks of different sizes.

In Fig. 4 is shown a movable frame, P, (detached from the principal frame A,) to which are attached the band-chisels Q Q, for turning down the bands or places to receive the metal bands that encircle the ends of the hubs, the cutting-off chisels R R R R, for cutting off the ends of the hubs, and the levers S S T S S, by means of which the chisels are operated. (All but one of the levers S are left off in the figure to show the other parts more clearly.) The form and construction of the sliding frame P are clearly shown in Fig. 4, and its relation to the frame A and other parts of the machine in Figs. 1, 2, and 3. The movable frame P is supported in its place in the principal frame A by tongues that fit into grooves $e$ in movable frame P. An arm, V, projecting from the rear of the movable frame, supports the band-chisel holder W, as shown. A rock-shaft, $f$, is hung to and supported by the arm V, and is also held steady by a brace or hanger, $g$, from the chisel-holder W. To this rock-shaft the levers X X Y and weighted lever Z are attached. A connecting-rod, U, connects the levers T and Y.

After the hub-block is roughed off, as before described, the operator, by pulling forward the lever T in the position shown by the red dotted lines in Fig. 3, throws the band-chisels Q Q forward against the hub-block and the bands are turned down. The operator then pushes back the lever T to its original position, which withdraws the chisels Q Q, or by simply letting go the lever T both it and the chisels will be returned to their original position by means of the weighted lever Z. The ends of the hubs are cut off by the chisels R R R R, which are thrown up by means of the levers S S S S. This may be done at the same time that the roughing-off chisels are in operation, and thus save time.

The moldings are turned by hand-chisels in the ordinary way, and may be done at any convenient time during the other operations of turning the hub.

The cutting-off chisels R R R R work in cores $h\ h\ h\ h$, which are secured in their position by screws, so that they can be readily changed and set to cut off any length of hub desired. The cores serve to hold the chisels steady.

The fulcrum of the levers S S S S, by which the chisels R R R R are operated, is a rod, $r$, that admits of change in the position of the levers to correspond with the position of the chisels.

As the position of the hub-block on the mandrel D is not always precisely the same, even for hubs that are intended to be the same size, it is necessary to provide a means of readily shifting the band and cutting-off chisels in proper relation to the hub-block. This is accomplished by attaching these chisels and the levers by which they are operated to the movable frame P, as shown in Fig. 4, which is operated by means of the lever $i$, with which the position of the movable frame P and chisels and levers attached thereto can be readily adjusted to the hub-block, whatever its position on the mandrel.

A gouge-chisel, 8, for cutting in or countersinking the box in the end of the hub, is attached to the top of a stud or holder, 9, which is mounted on a slide, 10, and is operated by lever 11. This operation completes the turning of the hub, which, it will readily be seen, can be easily and speedily accomplished by means of this machine.

The proper depth of the bands is determined by the gages 12 12, which are conveniently arranged on a rod, 13, as shown. When they are not in use they are turned back against rod 14 out of the way and convenient for use. After the block is roughed off the gages are turned over and the points rest on the block over the band-chisels, when the bands are turned down to the proper depth. This is known by the points of the gages dropping past block. The chisels are then withdrawn, as before described.

Having thus fully described my invention, what I claim as new therein, and desire to secure by Letters Patent, is—

1. The movable frame P, with the band-chisels Q Q, cutting-off chisels R R R R, levers S S T S S, and weighted lever Z thereto attached, when constructed, arranged, and operated substantially in the manner and for the purpose set forth.

2. The movable frame P and chisels and levers attached thereto, in combination with the roughing-off chisels and countersinking-chisel, when arranged and operated in the manner and for the purpose substantially as set forth.

HENRY C. SISCO.

Witnesses:
O. F. MAYHEW,
CHAS. S. WARE.